July 1, 1958 P. MUELLER 2,840,916

GAUGES AND PROCESS FOR MAKING THE SAME

Filed June 8, 1954

INVENTOR:
PAUL MUELLER
BY:

2,840,916
Patented July 1, 1958

2,840,916

GAUGES AND PROCESS FOR MAKING THE SAME

Paul Mueller, Munich, Germany, assignor to Hahn & Kolb Werkzeugmaschinen und Werkzeuge, Stuttgart, Germany Application June 8, 1954, Serial No. 435,247

Claims priority, application Germany June 10, 1953

19 Claims. (Cl. 33—168)

The present invention relates to gauges such as inside and outside calipers and the like for measuring articles manufactured usually in mass production.

As is well known, gauges of this type are extremely expensive because of the precision with which they must be manufactured and because of the high quality of the metal used in these gauges. Usually the gauges include two or more feeler members which are removably connected to a spacer member of a very high quality metal which holds the feeler members apart from each other at a predetermined precise distance in accordance with the size of the gauge. These spacer members are manufactured very precisely and are very expensive. When the feeler members become worn they are removed from the spacer member and reground and then replaced on the spacer member, so that in this way, the costs of replacing worn gauges are substantially reduced. However, because of the high expense of the spacer members themselves the gauges are usually used to a far less extent than would be the case if more inexpensive gauges were provided.

One of the objects of the present invention is to provide gauges which are far less expensive than the known gauges discussed above.

A further object of the present invention is to provide gauges whose feeler members when worn may be easily removed from the gauge, refinished, and joined to a new spacer member.

Another object of the present invention is to provide very inexpensive spacer members which are securely connected to the feeler members without bolts, threads, or the like.

An additional object of the present invention is to interconnect a pair of feeler members with a structure which has a relatively low coefficient of thermal expansion so that the precise distance between the feeler members is assured through a large range of temperatures.

A still further object of the present invention is to provide a process according to which gauges may be quickly and easily manufactured at an extremely low cost, so that the gauges of the invention may be economically used to a far greater extent than the known gauges.

Still another object of the present invention is to manufacture gauges according to a process which permits one or more gauge blocks to be used repeatedly in the manufacture of the gauges of the invention.

With the above objects in view, the present invention mainly consists of a gauge which includes a pair of metallic feeler members for engaging an article to be measured and a means supporting the feeler members and holding the same apart from each other at a precise predetermined distance, this means ebing made at least in part of a nonmetallic plastic material having a melting point substantially lower than that of the feeler members.

Also, with the above objects in view the present invention mainly consists of a process for manufacturing a gauge, this process including the steps of holding a pair of metallic feeler members apart from each other at a precise predetermined distance by means of a metallic gauge block engaging the feeler members, pouring a molten plastic having a melting point substantially below that of the feeler members and gauge block between and into engagement with the feeler members, cooling the molten plastic until it solidifies so that the solidified plastic holds the feeler members together at a distance from each other precisely determined by the gauge block, and then removing the gauge block from the feeler members so that the same gauge block may again be used for making another gauge.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Figures 1, 2, 3, 4, 5, 6, 7, 8, 9:
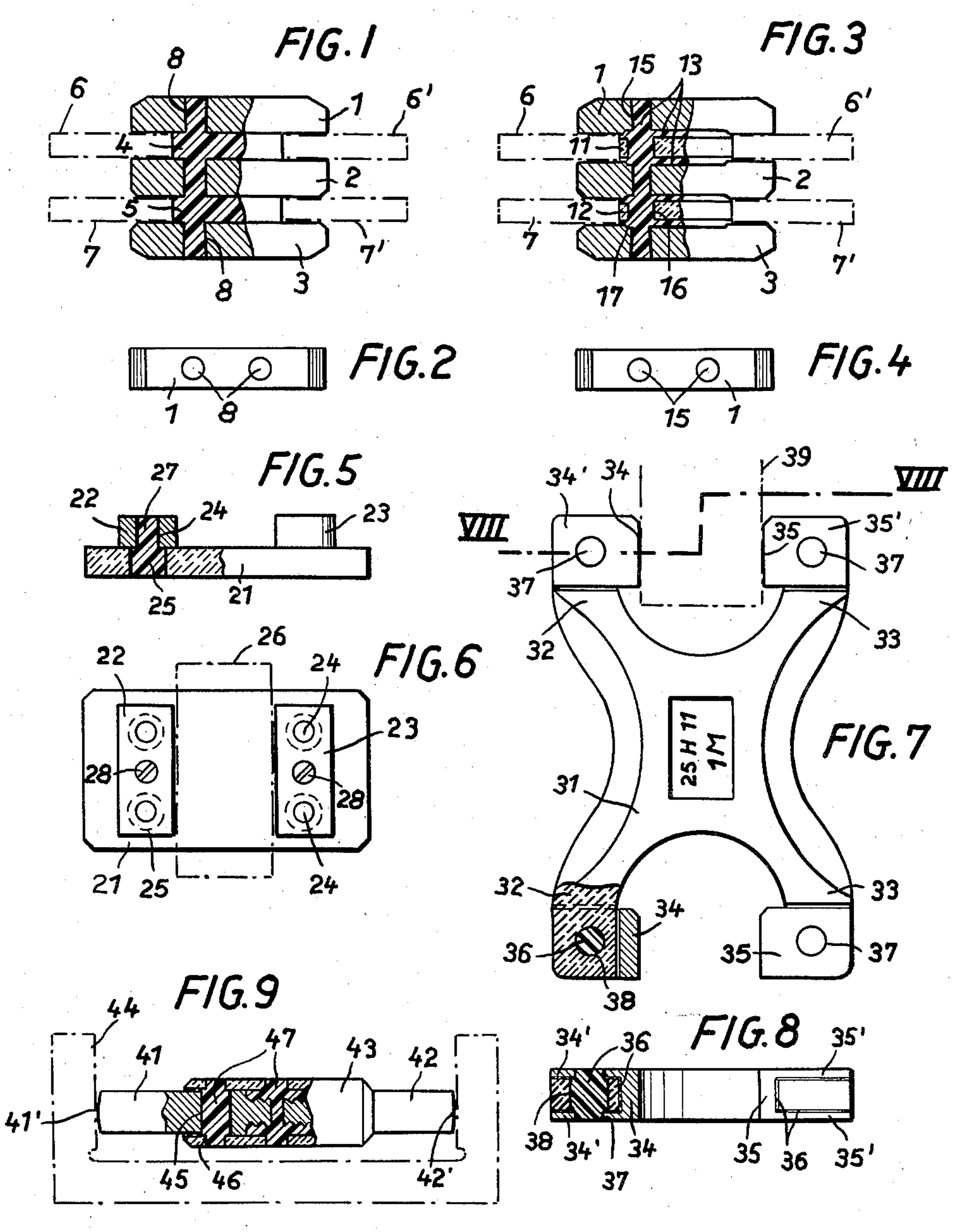
Fig. 1 is a partly sectional elevational view of a gauge constructed in accordance with the present invention, Fig. 1 showing in dot-dash lines the position of gauge blocks used in the manufacture of the gauge of Fig. 1.
Fig. 2 is a top plan view of the gauge of Fig. 1.
Fig. 3 is a view corresponding to Fig. 1 on a slightly different embodiment of the invention.
Fig. 4 is a top plan view of the gauge of Fig. 3.
Fig. 5 is a partly sectional elevational view of a third embodiment of a gauge constructed in accordance with the present invention.
Fig. 6 is a top plan view of the gauge of Fig. 5 and shows in dot-dash lines the position of a gauge block used in the manufacture of the gauge of Figs. 5 and 6.
Fig. 7 is a partly sectional elevational view of yet another embodiment of the present invention and also shows in dot-dash lines a part of a gauge block used in the manufacture of the gauge of Fig. 7.

Fig. 8 is a partly sectional view of the gauge of Fig. 7 taken along the line VIII—VIII of Fig. 7 and looking downwardly, as viewed in Fig. 7; and Fig. 9 is a partly sectional view of still another embodiment of a gauge constructed in accordance with the present invention, Fig. 9 also showing in dot-dash lines the position of a gauge block with respect to the gauge of Fig. 9 during the manufacture of this gauge.

Referring now to the drawings, Figs. 1 and 2 show a gauge which includes three feeler members 1, 2 and 3 with a means 4, 5 located between the feeler members 1, 2 and 3 for maintaining them at a precise predetermined distance apart from each other, these feeler members extending at their free end portions beyond the means 4, 5. In known constructions means 4, 5 takes the form of very accurately constructed steel blocks, so-called gauge blocks, which are connected with the feeler members 1, 2 and 3 through the medium of screw members or the like.

According to the present invention, the means 4, 5 takes the form of a plastic material which solidifies upon cooling and which is poured between the feeler members 1, 2 and 3 in any suitable mold, these feeler members being made of metal and the material of the means 4, 5 having a melting point substantially below that of the feeler members. In manufacturing the gauge of Figs. 1 and 2 the mold is equipped to receive the gauge blocks 6, 7, 6', 7', and to hold them between the feeler members 1, 2 and 3 in the position shown in Fig. 1, so that the mold together with the feeler members and gauge blocks defines the free space which receives the molten material forming the means 4, 5. These gauge blocks 6—7' are are of course quite expensive, are made of an extremely hard metal, and are extremely accurate in their size so that they serve to space the feeler members 1, 2 and 3 from each other very precisely. The plastic material 4, 5 is preferably one which cools and solidifies quickly, and after hardening of this material the parts are removed from the mold and have the construction shown in Fig. 1, the gauge blocks being removed so that they may be used again and again in the manufacture of calipers of the construction shown in Figs. 1 and 2.

In order to provide a secure connection between the feeler members 1, 2 and 3 through the medium of the material 4, 5, each of the gauge blocks is provided with a pair of bores 8, and it will be noted that the bores of the several feeler members are located about a pair of straight lines so that these bores are in alignment with each other. The material 4, 5 fills the bores to secure the parts together, and these bores may have a conical shape into which the material 4, 5 flows for securely holding the parts together. Furthermore, it is possible to roughen the surface of the feeler members which comes in contact with the plastic material 4, 5 in order to enchange the security of the connection between the feeler members.

In order to be able to regrind or otherwise refinish the feeler members after they become worn, it is only necessary to break up the plastic material 4, 5 in order to free the feeler members 1—3 from this plastic material. After refinishing of the feeler members so that the surfaces thereof which engage an article to be measured are again accurate, these feeler members are again joined to a plastic material 4, 5 in the manner described above so that another gauge is provided.

It is preferred to use for the plastic material a resin which solidifies upon cooling. Preferably the resin is filled with a ceramic filler material such as diatomaceous earth (kieselguhr), particles of quartz or the like. With such a filler material the coefficient of thermal expansion of the means 4, 5 as well as its shrinkage during hardening is greatly reduced.

While according to the embodiment of Figs. 1 and 2 the means 4, 5 is exclusively made up of a plastic material poured into a mold, in the manner described above, the embodiment of Figs. 3 and 4 which has the same outer appearance as the embodiment of Figs. 1 and 2 differs from that of Figs. 1 and 2 essentially by the fact that plates 11 and 12 are embedded in the plastic material, these plates 11 and 12 being made of a material which has a very low co-efficient of thermal expansion. A material such as steatite is preferred for the plates 11 and 12. It will be noted from Fig. 3 that the thickness of the plates 11 and 12 is less than the distance between the feeler members. In manufacturing the gauge of Figs. 3 and 4 the plates 11 and 12 are held by engagement with the blocks 6—7′ in spaced relation to the feeler members 1—3 so that relatively narrow gaps remain between the feeler members and plates 11 and 12, and these gaps are filled with the plastic material 13, which may be the same material as the plastic 4, 5 of Fig. 1. In order to securely connect the plastic material 13 with the plates 11 and 12 and the feeler members 1—3, the feeler members are formed with bores 15 while the plates 11 and 12 are formed with bores 16, and these bores are aligned in the manner shown in Fig. 3. The sizes of bores 15 and 16 are preferably different, and in the particular example illustrated in Fig. 3, the bores 16 have a larger diameter than the bores 15. Furthermore, at the parts thereof which face the plates 11 and 12, the feeler members 1—3 are formed with small grooves, depressions, or the like 17, or with any other roughening, in order to guarantee a secure connection to the plastic material. It will be noted that the plastic material fills the entire space defined by the gauge blocks, feeler members, and plates 11 and 12, and that the embodiment of Fig. 3 limits the plastic material 13 to relatively thin layers between the feeler members so that in this way the influence of temperature changes and shrinkage is almost completely eliminated.

According to the embodiment of the invention shown in Figs. 5 and 6, the means which supports the feeler members 22 and 23 at the precise predetermined spaced relationship from each other takes the form of a plate 21 preferably consisting of a material having a very low coefficient of thermal expansion, such as, for example, a ceramic material similar to that of plates 11 and 12 of Figs. 3 and 4. However, if desired, the plate 21 may be made of metal. According to the embodiments of Figs. 5 and 6, the feeler members 22 and 23 are located on the top face of plate 21, as viewed in Fig. 5, and are formed with bores 24 which are respectively aligned with bores 25 formed with the plate 21, and, as is evident from Figs. 5 and 6, the bores 24 are respectively aligned with the bores 25 when the gauge block 26 is located between the feeler members 23. In the particular example illustrated the bores 25 have a larger diameter than the bores 24. With the feeler members 22 and 23 accurately spaced from each other by the gauge block 26 in the position shown in Fig. 6, the bores 24 and 25 are filled with a plastic material 27 which upon solidifying holds the parts securely together. It is only necessary to remove the block 26 after hardening of the material 27, and the gauge is complete, this block 26 then being available for use in the manufacture of further gauges. When it becomes necessary to refinish the feeler members 22 and 23, the plastic material 27 is simply driven with any suitable tool out of the bores 24 and 25 and is broken in this process. After refinishing of the feeder members 22 and 23 they are again assembled with the plate 21 in the manner described above. If desired the feeler members 22 and 23 can additionally be secured to the plate 21 with screw members 28 which threadedly engage the plate 21 and which extend freely through bores of the feeler members 22 and 23 which are of a larger diameter than that of the shanks of the screw members 28.

According to the embodiment of the invention shown in Figs. 7 and 8, a plate 31 is provided to hold the feeler members together, this plate 31 having a central body portion from which a plurality of legs 32 and 33 extend, the legs 32 being located on one side and the legs 33 being located on the opposite side of the plate 31, as is evident from Fig. 7. This plate 31 is preferably made of a ceramic material or any other material which is sufficiently hard and which has a low coefficient of thermal expansion. The feeler members 34 and 35 are respectively mounted on the legs 32 and 33, as shown in Fig. 7. As is evident particularly from the portions of Figs. 7 and 8 shown in section, the feeler members 34 and 35 are channel-shaped so as to be provided with opposite wall portions, and the legs 32 and 33 extend into the space between these wall portions. When the gauge of Fig. 7 is designed to measure the outer dimensions of an article, the feeler members are arranged so that their measuring surfaces confront each other, in the manner illustrated in Fig. 7. As is particularly apparent from Fig. 8, the outer free ends of legs 32 and 33, which are received between the wall portions 34′ and 35′ of the feeler members, have a thickness which is slightly less than the distance between these wall portions so that a thin layer of the plastic material 36 is located between the legs 32 and 33 and the wall portions 34′ on the one hand and 35′ on the other hand. The wall portions 34′ and 35′ are formed with bores 37 while the free ends of legs 32 and 33 are formed with bores 38 aligned with the bores 37, as shown in Fig. 8, and the bores 38 are preferably of a larger diameter than the bores 37. The plastic material 36 is thus poured into these bores so as to fill the same and so as to fill the thin gap between the feeler members and legs 32 and 33, in order to interconnect the feeler members with the plate 31, the feeler members being spaced from each other by the block 39 until the plastic material 36 solidifies. It will be noted from Figs. 7 and 8 that the gap between each feeler member and the leg carrying the same extends along the side wall portions of each feeler member and along the inner face of the leg carrying the feeler member. In order to remove the feeler members for refinishing purposes, it is only necessary to shatter the plastic material 36, and then the above manufacturing of the gauge of Figs. 7 and 8 is repeated after finishing of the feeler members.

Fig. 9 shows a gauge adapted to measure, for example, the inner diameter of the bore of an article. This gauge includes a pair of rod-like feeder members 41 and 42 which extend outwardly from the interior of a tubular member 43 respectively through opposite open ends of the latter. This tubular member 43 preferably is made of a material having a low coefficient of thermal expansion, such as a ceramic material. The outer free end faces 41' and 42' of the feeler members are the surfaces which engage the article to be measured. A free space remains in the interior of member 43 between the inner ends of members 41 and 42 when the faces 41' and 42' are in engagement with a gauge block 44 having an inner diameter corresponding to the size which is to be given to the gauge of Fig. 9. The tubular member 43 is formed adjacent each of its ends with a pair of opposed bores 46 as well as with a pair of opposed bores in a central portion thereof, and the feeler members 41 and 42 are formed with bores 45 respectively aligned with the pair of bores 46 and being of a larger diameter than the same. Furthermore, the inner free ends of feeler members 41 and 42 are reduced and formed with grooves or the like to rigidly secure these feeler members to the plastic material 47 which is poured into the space between tubular member 43 and feeler members 41 and 42 as well as into the bores 45 and 46. Furthermore, it will be noted that the outer diameter of the feeler members 41 and 42 can be somewhat smaller than the inner diameter of the sleeve 43 so that the plastic material 47 becomes located in the annular spaced formed between the pins 41 and 42 and the tubular member 43.

With respect to the material of the plastics used in all embodiments of the invention to hold the feeler members together, it is pointed out that in addition to solidifying quickly and having a low coefficient of thermal expansion, this material must be influenced to an extremely small degree by humidity and must have a melting point whose temperature is low enough not to produce any changes in the sizes of the feeler members and blocks during the manufacture of the gauges. The above-mentioned resin which solidifies quickly and which may be filled with kielselguhr or particles of quartz is particularly suitable for this purpose and forms upon solidifying a glass-like body which in its solid state provides a good bond with the metal surfaces without pressing into the molecules of the metal bodies. Furthermore, it is possible to use for the plastic material a metal alloy of low melting point or a material such as gypsum or cement, although the above-discussed resin is preferred since it may be shattered easily when it is necessary to remove the feeler members for regrinding purposes.

It will be understood that each of the elements described above, or two or more together, may also find a useful application in other types of gauges differing from the types described above.

While the invention has been illustrated and described as embodied in gauges and process for making same, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A gauge comprising, in combination, a pair of one-piece metallic feeler members each having a feeler surface for engaging an article to be measured, said feeler members having precisely predetermined characteristics at said feeler surfaces thereof and requiring precisely predetermined characteristics only at said feeler surfaces thereof; and rigid means fixed to said feeler members and holding said feeler surfaces apart from each other at a precise, predetermined distance, said means being made at least at all portions in direct engagement with said feeler members of a non-metallic plastic having a melting point substantially lower than that of said feeler members.

2. A gauge comprising, in combination, a pair of one-piece metallic feeler members for engaging an article to be measured, said feeler members having precisely predetermined characteristics at said feeler surfaces thereof and requiring precisely predetermined characteristics only only at said feeler surfaces thereof; and rigid means fixed to said feeler members each having a feeler surface and holding said feeler surfaces apart from each other at a precise, predetermined distance, said means being made at least at the part thereof connected directly to and engaging said feeler members of a non-metallic plastic having a melting point substantially lower than that of said feeler members, and said rigid means being separable from said feeler members only by destruction of said rigid means.

3. A gauge comprising, in combination, a pair of one-piece feeler members each having a feeler surface for engaging an article to be measured, each feeler member being formed with a bore passing therethrough; and rigid means fixed to said feeler members and holding said feeler surfaces apart from each other at a precise, predetermined distance, said means extending into said bores and being made at the portion thereof located in and adjacent to said bores of a material having a melting point substantially lower than that of said feeler members.

4. A gauge comprising, in combination, a pair of one-piece metallic feeler members each having a feeler surface for engaging an article to be measured, said feeler members having precisely predetermined characteristics at said feeler surfaces thereof and requiring precisely predetermined characteristics only at said feeler surfaces thereof, each feeler member being formed with a bore passing therethrough; and rigid means fixed to said feeler members and holding said feeler surfaces apart from each other at a precise, predetermined distance, said means extending into said bores and being made at the portion thereof located in and adjacent to said bores of a non-metallic plastic having a melting point substantially lower than that of said feeler members, and said rigid means being separable from said feeler members only by destruction of said rigid means.

5. A gauge comprising, in combination, a plurality of one-piece metallic feeler members respectively having feeler surfaces spaced from and parallel to each other, said feeler members having precisely predetermined characteristics at said feeler surfaces thereof and requiring precisely predetermined characteristics only at said feeler surfaces thereof, each feeler member being formed along a straight line passing through all of said feeler members with a bore so that said bores are in alignment with each other; and a rigid body of plastic material of a melting point substantially less than that of said metallic feeler members located between the latter and extending into said bores to connect said feeler members together and to hold said surfaces apart from each other at a precise predetermined distance.

6. A gauge comprising, in combination, a plurality of metallic feeler members spaced from and parallel to each other, each feeler member being formed along a straight line passing through all of said feeler members with a bore so that said bores are in alignment with each other; a plastic material of a melting point substantially less than that of said metallic feeler members located between the latter and filling said bores to connect said feeler members together and to hold the same apart from each other at a precise predetermined distance; and a ceramic plate embedded in said plastic material and located between each pair of adjacent feeler members.

7. A gauge comprising, in combination, a plurality of metallic feeler members spaced from and parallel to each other, each feeler member being formed along a straight line passing through all of said feeler members with a bore so that said bores are in alignment with each other; a plastic material of a melting point substantially less than that of said metallic feeler members located between the latter and filling said bores to connect said feeler members together and to hold the same apart from each other at a precise predetermined distance; and a ceramic plate embedded in said plastic material and located between each pair of adjacent feeler members, said plate being formed with a bore located along said line and filled with said plastic material.

8. A gauge comprising, in combination, a plurality of metallic feeler members spaced from and parallel to each other, each feeler member being formed along a straight line passing through all of said feeler members with a bore so that said bores are in alignment with each other; a plastic material of a melting point substantially less than that of said metallic feeler members located between the latter and filling said bores to connect said feeler members together and to hold the same apart from each other at a precise predetermined distance; and a ceramic plate embedded in said plastic material and located between each pair of adjacent feeler members, said plate being formed with a bore located along said line and filled with said plastic material, and said bore of said plate being of a greater diameter than said bores of said feeler members.

9. A gauge comprising, in combination, a plate consisting of a ceramic material and formed with at least one pair of mutually spaced bores; a pair of metallic feeler members located against one face of said plate and being spaced from each other by a precise, predetermined distance, said feeler members respectively being formed with bores which are respectively aligned with said bores of said plate; and a plastic material of a substantially lower melting point than said feeler members and plate filling said bores to interconnect said feeler members with said plate.

10. A gauge comprising, in combination, a plate consisting of a ceramic material and formed with at least one pair of mutually spaced bores; a pair of metallic feeler members located against one face of said plate and being spaced from each other by a precise, predetermined distance, said feeler members respectively being formed with bores which are respectively aligned with and of a different diameter than said bores of said plate; and a plastic material of a substantially lower melting point than said feeler members and plate filling said bores to interconnect said feeler members with said plate.

11. A gauge comprising, in combination, a plate consisting of a ceramic material and formed with at least one pair of mutually spaced bores; a pair of metallic feeler members located against one face of said plate and being spaced from each other by a precise, predetermined distance, said feeler members respectively being formed with bores which are respectively aligned with and of a smaller diameter than said bores of said plate; and a plastic material of a substantialy lower melting point than said feeler members and plate filling said bores to interconnect said feeler members with said plate.

12. A gauge comprising, in combination, a plate of ceramic material having a central body portion and a plurality of legs projecting from said body portion, each of said legs having an outer free end portion formed with a bore passing therethrough; a plurality of metallic channel-shaped feeler members each having a pair of spaced wall portions, said outer free end portions of said legs being respectively located between said wall portions of said feeler members and said latter wall portions being formed with bores respectively aligned with said bores of said legs; and a plastic material of a melting point substantially lower than that of said plate and feeler members located in and filling all of said bores to interconnect said feeler members with said plate, said feeler members respectively having feeler surfaces pairs of which are precisely spaced from each other and said feeler members respectively having precisely predetermined characteristics at said feeler surfaces thereof and requiring precisely predetermined characteristics only at said feeler surfaces thereof.

13. A gauge comprising, in combination, a plate of ceramic material having a central body portion and a plurality of legs projecting from said body portion, each of said legs having an outer free end portion formed with a bore passing therethrough; a plurality of metallic channel-shaped feeler members each having a pair of spaced wall portions, said outer free end portions of said legs being respectively located between said wall portions of said feeler members and said latter wall portions being formed with bores respectively aligned with said bores of said legs and of a different diameter than said latter bores; and a plastic material of a melting point substantially lower than that of said plate and feeler members located in and filling all of said bores to interconnecct said feeler members with said plate, said feeler members respectively having feeler surfaces pairs of which are precisely spaced from each other and said feeler members respectively having precisely predetermined characteristics at said feeler surfaces thereof and requiring precisely predetermined characteristics only at said feeler surfaces thereof.

14. A gauge comprising, in combination, an elongated tubular ceramic member having opposite open ends and being formed adjacent each of said ends with a pair of opposed bores passing through the wall of said tubular member; a pair of metallic feeler members respectively extending through said open ends into the interior of said tubular member, said feeler members being formed at their portions located within said tubular member with bores aligned with said bores of said tubular member; and a plastic material of a lower melting point than that of said feeler members and tubular member filling the space within the latter not occupied by said feeler members and filling said bores to interconnect said feeler members with said tubular member.

15. A gauge comprising, in combination, a pair of one-piece metallic feeler members each having a feeler surface for engaging an article to be measured, said feeler members respectively having precisely predetermined characteristics at said feeler surfaces thereof and requiring precisely said predetermined characteristics only at said feeler surfaces thereof; and rigid means fixed to said feeler members and holding said surface apart from each other at a precise, predetermined distance, said means being made at least at all portions in direct engagement with said feeler members of a resin which solidifies upon cooling and which has a melting point substantially lower than that of said feeler members, and said rigid means being separable from said feeler members only by destruction of said rigid means.

16. A gauge comprising, in combination, a pair of one-piece metallic feeler members each having a feeler surface for engaging an article to be measured, said feeler members respectively having precisely predetermined characteristics at said feeler surfaces thereof and requiring precisely said predetermined characteristics only at said feeler surfaces thereof; and rigid means fixed to said feeler members and holding said surfaces apart from each other at a precise, predetermined distance, said means being made at least at all portions in direct engagement with said feeler members of a resin which solidifies upon cooling, which is mixed with an inert filler having a low coefficient of thermal expansion, and which has a melting point substantially lower than that of said feeler members.

17. A process for manufacturing a gauge comprising the steps of placing a gauge block in engagement with a pair of metallic feeler surfaces of a pair of feeler members formed with openings therein for maintaining said surfaces apart from each other at a precise predetermined distance, said gauge block leaving said openings unobstructed; pouring a molten plastic having a melting point substantially below that of said feeler members and gauge block between and into engagement with said feeler members and into said openings thereof; cooling said molten plastic until it solidifies so that said solidified plastic holds said feeler members together with said surfaces at a distance from each other precisely determined by said gauge block; and removing said gauge block from said feeler members, so that the same gauge block may again be used for making another gauge.

18. A process for manufacturing a gauge comprising the steps of placing a gauge block in engagement with a pair of metallic feeler surfaces of a pair of feeler members formed with openings therein for maintaining said surfaces apart from each other at a precise predetermined distance, said gauge block leaving said openings unobstructed; pouring a molten plastic having a melting point substantially below that of said feeler members and gauge block between and into engagement with said feeler members and into said openings thereof; cooling said molten plastic until it solidifies so that said solidified plastic holds said feeler members together with said surfaces at a distance from each other precisely determined by said gauge block; and removing said gauge block from said feeler members, so that the same gauge block may again be used for making another gauge.

19. A process for manufacturing a gauge comprising the steps of holding a pair of metallic feeler members apart from each other at a precise predetermined distance by means of a metallic gauge block engaging free ends of said feeler members and located about said feeler members; pouring a molten plastic having a melting point substantially below that of said feeler members and gauge block between and into engagement with said feeler members; cooling said molten plastic until it solidifies so that said solidified plastic holds said feeler members together at a distance from each other precisely determined by said gauge block; and removing said gauge block from said feeler members, so that the same gauge block may again be used for making another gauge.

References Cited in the file of this patent

UNITED STATES PATENTS

| | | |
|---|---|---|
| 1,887,372 | Emmons | Nov. 8, 1932 |
| 2,255,184 | Osenberg | Sept. 9, 1941 |
| 2,308,324 | Bernander | Jan. 12, 1943 |
| 2,345,749 | Hohwart | Apr. 4, 1944 |
| 2,409,864 | Ingouf et al. | Oct. 22, 1946 |
| 2,537,340 | Fonda | Jan. 9, 1951 |

FOREIGN PATENTS

| | | |
|---|---|---|
| 582,291 | Great Britain | Nov. 12, 1946 |
| 26,974/05 | Great Britain | A. D. Dec. 27, 1905 |
| 484,099 | Germany | Oct. 9, 1929 |
| 263,690 | Switzerland | Dec. 1, 1949 |

OTHER REFERENCES

Publication, Johansson Gage Blocks, Ford Motor Co., Dearborn, Michigan, June 1, 1945, page 22.